(12) United States Patent
Wu et al.

(10) Patent No.: US 8,451,543 B2
(45) Date of Patent: May 28, 2013

(54) MAGNET HOLDING STRUCTURE OF AUTO-FOCUS MODULE

(75) Inventors: Fu-Yuan Wu, Yangmei Taoyuan (TW); Shang-Yu Hsu, Yangmei Taoyuan (TW)

(73) Assignee: TDK Taiwan Corporation, Taipei (TW)

( * ) Notice: Subject to any disclaimer, the term of this patent is extended or adjusted under 35 U.S.C. 154(b) by 286 days.

(21) Appl. No.: 12/945,018

(22) Filed: Nov. 12, 2010

(65) Prior Publication Data

US 2012/0120510 A1 May 17, 2012

(51) Int. Cl.
*G02B 15/14* (2006.01)

(52) U.S. Cl.
USPC .......................................................... 359/696

(58) Field of Classification Search
USPC ............... 359/694, 696, 822–824; 369/44.15, 369/44.16; 396/79, 85, 529; 348/345, 374, 348/376
See application file for complete search history.

(56) References Cited

U.S. PATENT DOCUMENTS 7,663,823 B2 * 2/2010 Chung .......................... 359/824

* cited by examiner

*Primary Examiner* — Joseph P Martinez
(74) *Attorney, Agent, or Firm* — Muncy, Geissler, Olds & Lowe, PLLC

(57) ABSTRACT

A magnet holding structure of auto-focus module includes an outer frame for holding four magnets to four inner wall surfaces of the outer frame; a lens holder for holding a lens thereto and being assembled to the outer frame via at least one spring member; and a winding fitted around the lens holder for driving the lens holder to axially move forward or rearward to focus automatically. The outer frame is provided at each of four inner corners with an inverted L-shaped plate extending downward from a top of the outer frame to locate between the lens holder and the winding, so as to face toward four spaces respectively existing between two adjacent magnets outside the winding. With these arrangements, the electromagnetic field produced by the winding can have enhanced magnetic efficiency and increased driving force at the corners of the winding to achieve the purpose of power saving.

2 Claims, 4 Drawing Sheets

Fig. 1 (Piror Art)

Fig. 2 (Piror Art)

MAGNET HOLDING STRUCTURE OF AUTO-FOCUS MODULE

FIELD OF THE INVENTION

The present invention relates to a magnet holding structure of auto-focus module, and more particularly to a structure in a miniature lens auto-focus module to enable enhanced magnetic induction efficiency on the winding.

BACKGROUND OF THE INVENTION

With the progress in scientific technologies as well as the modularization and miniaturization of camera lens, it is now possible to produce digital cameras having a very small volume, and most of currently available mobile phones are provided with the function of a digital camera. There are various types of auto-focus driving structures for the conventional miniature lens. Among others, the voice coil motor (VCM) is the currently most widely employed auto-focus driving structure. This is because the VCM has the advantages of small volume, low power consumption, accurately actuated displacement, and cost-effective, and is therefore very suitable for short-distance driving in miniature lens auto-focusing.

FIG. 1 is an exploded perspective view of a conventional auto-focus module, which includes an outer frame 10 serving as a housing, a bottom cover 11, a lens holder 12 provided with internal threads 15, four magnets 14 separately mounted to four inner wall surfaces of the outer frame 10, a lens 16 screwed into the lens holder 12, a winding 17 fitted around the lens holder 12, and an upper and a lower spring plate 18, 19 for supporting the lens holder 12 at a center of the outer frame 10, so that the lens holder 12 is axially forward and rearward movable in the outer frame 10 along a center axis thereof. When the winding 17 is excited by supplying electric current thereto, a magnetic field is produced for the winding 17 and the magnets 14 to magnetically repel or attract one another, so that the lens holder 12 and the lens 16 screwed thereto are brought to axially move forward or rearward to focus automatically.

FIG. 2 is a perspective view of an assembly of the outer frame 10, the magnets 14 and the winding 17 shown in FIG. 1. As can be clearly seen in FIG. 2, the magnets 14 do not cover four inner corners 20 of the outer frame 10. Therefore, the electromagnetic field produced by the excited winding 17 does not magnetically repel or attract the magnets 14 at the four inner corners 20, causing waste of the electromagnetic field and reduced driving efficiency. This means more power must be consumed to drive the miniaturized auto-focus module.

Therefore, the conventional auto-focus module requires further improvement to avoid waste of the electromagnetic field. For this purpose, it is tried by the inventor to develop a magnet holding structure of auto-focus module, in which four inverted L-shaped plates are separately provided at four inner corners of the outer frame to downward extend from a top of the outer frame and correspond to the spaces existing between any two adjacent magnets, so as to enhance the magnetic efficiency between the magnets and the winding.

SUMMARY OF THE INVENTION

A primary object of the present invention is to provide a magnet holding structure of auto-focus module for enhancing the magnetic field efficiency at the corners of the winding, so as to increase the driving force of the electromagnetic field produced by the excited winding and achieve the purpose of power saving.

To achieve the above and other objects, the magnet holding structure of auto-focus module according to a preferred embodiment of the present invention includes an outer frame for holding four magnets to four inner wall surfaces of the outer frame; a lens holder for holding a lens thereto and being assembled to the outer frame via at least one spring member; and a winding mounted around the lens holder for driving the lens holder to axially move forward or rearward to focus automatically. The outer frame is provided at each of four inner corners with an inverted L-shaped plate extending downward from a top of the outer frame to locate between the lens holder and the winding, so as to face toward four spaces respectively existing between two adjacent magnets outside the winding. With these arrangements, the electromagnetic field produced by the excited winding can have enhanced magnetic efficiency at the corners of the winding.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and with reference to the accompanying drawings. It is understood the accompanying drawings are illustrated only for assisting in describing the present invention and not intended to limit the present invention.

Figure 1:
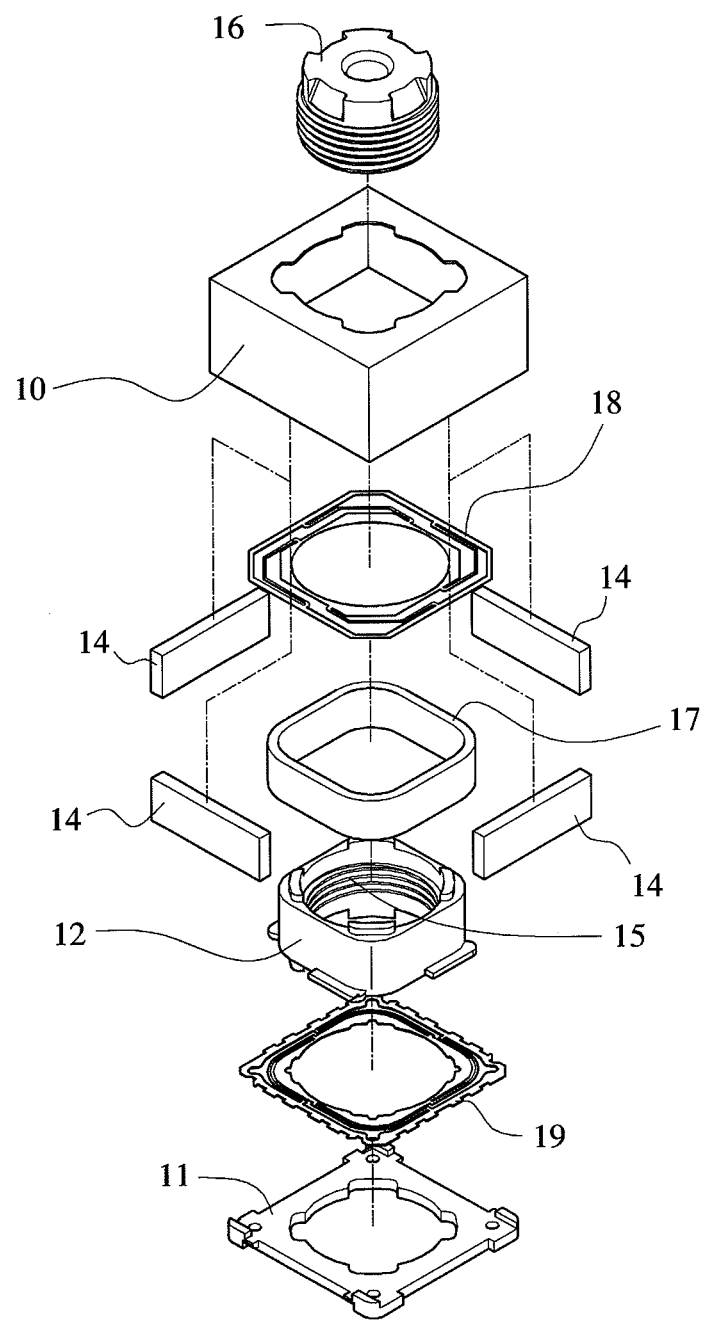
FIG. 1 is an exploded perspective view of a conventional auto-focus module.
Figure 2:
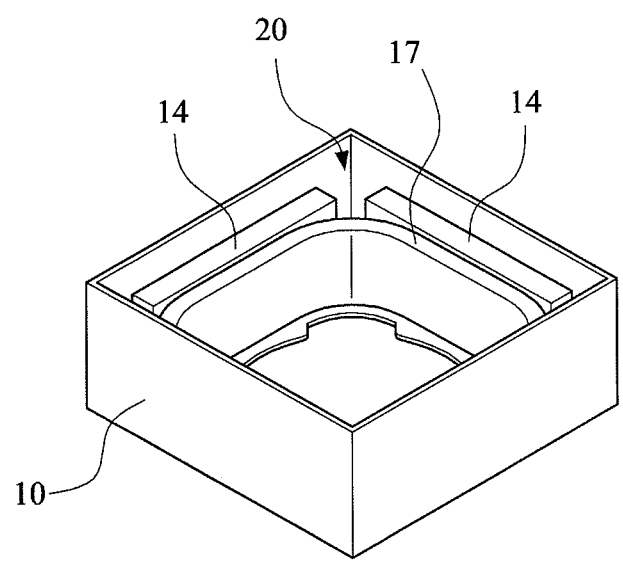
FIG. 2 is a perspective view of an assembly of the outer frame, magnets and winding shown in FIG. 1.
Figure 3:
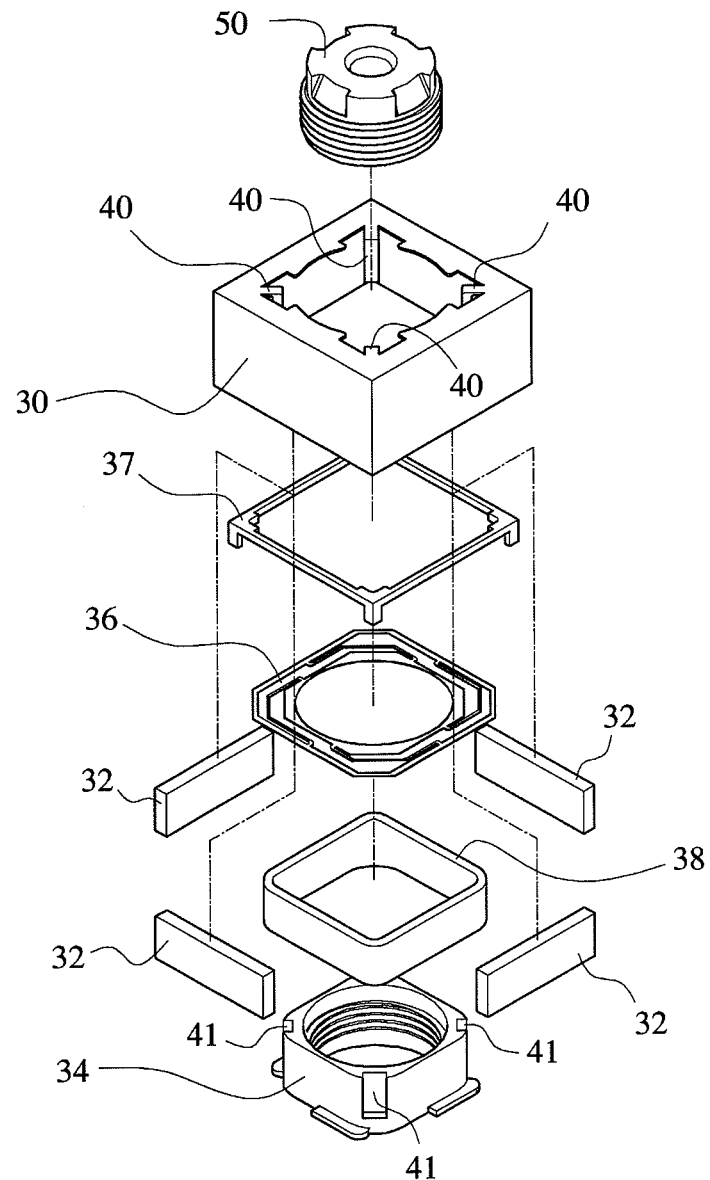
FIG. 3 is an exploded perspective view showing a preferred embodiment of the present invention.
Figure 4:
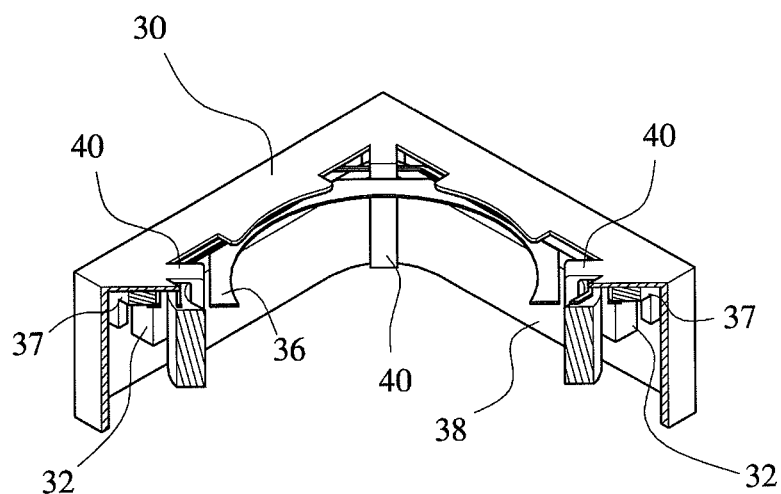
FIG. 4 is an assembled sectional perspective view of part of the elements shown in FIG. 3.

Please refer to FIG. 3 that is an exploded perspective view showing a preferred embodiment of the present invention and to FIG. 4 that is an assembled sectional perspective view of part of the elements shown in FIG. 3. As shown, an auto-focus module according to the present invention includes an outer frame 30, four magnets 32, a lens holder 34, at least one spring member 36, a spacer 37, and a winding 38. The outer frame 30 is a square member made of a metal material, and the four magnets 32 are mounted to four inner wall surfaces of the outer frame 30. The lens holder 34 internally defines an axially extended hole for a lens 50 to mount therein, and is assembled to and located in the outer frame 30 via the spring member 36.

The spring member 36 includes an outer fixed portion and an inner movable portion. The lens holder 34 is connected to the inner movable portion of the spring member 36, and the spring member 36 is connected at the outer fixed portion to the outer frame 30 via the spacer 37. An axially extended operation space is formed between the space 37 and a top of the outer frame, allowing the lens holder 34 to movably suspend in the outer frame 30.

The winding 38 is in the form of a square ring for fitting around an outer side of the lens holder 34. When the winding 38 is excited by supplying electric current thereto, an electromagnetic field is produced, bringing the winding 38 and the magnets 32 to magnetically repel or attract one another, so as to drive the lens holder 34 to axially move forward or rearward to focus automatically.

A receiving space 41 is formed between each of four outer corners of the lens holder 34 and the winding 38. Preferably, the receiving spaces 41 are formed by providing a groove at each of the four outer corners of the lens holder 34.

The outer frame 30 is provided at each of four inner corners with an inverted L-shaped plate 40. The inverted L-shaped plates 40 extend downward from the top of the outer frame 30 to locate in the receiving spaces 41 between the lens holder 34 and the winding 38, such that the inverted L-shaped plates 40 separately face toward four spaces respectively existing between two adjacent magnets 32 outside the winding 38. Preferably, the inverted L-shaped plates 40 are integrally formed with the outer frame 30, and are able to enhance the magnetic efficiency of the electromagnetic field at four corners of the winding 38 to provide increased driving force.

Experimental results indicate that, with the inverted L-shaped plates provided at the four inner corners of the outer frame as disclosed in the present invention, the magnetic field efficiency at the corners of the winding is enhanced to be 1.95 times higher than that in the conventional auto-focus module. Therefore, the driving force of the electromagnetic field produced by exciting the winding is increased to achieve the effect of power saving. Thus, the present invention provides a magnet holding structure of auto-focus module that is completely different from the prior art auto-focus module to enable upgraded overall applicability and value of the auto-focus module.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A magnet holding structure of auto-focus module comprising:
    an outer frame made of a metal material for holding four magnets to four inner wall surfaces of the outer frame;
    a lens holder internally defining an axially extended hole for a lens to mount therein and being assembled to and located in the outer frame via at least one spring member; and
    a single integral winding being in the form of a square ring for fitting around an outer side of the lens holder for producing an electromagnetic field, so that the winding and the magnets are brought to magnetically repel or attract one another and accordingly drive the lens holder to axially move forward or rearward to focus automatically;
    wherein the outer frame is provided at each of four inner corners with an inverted L-shaped plate extending downward from a top of the outer frame to locate between the lens holder and the winding, such that the inverted L-shaped plates separately face toward four spaces respectively existing between two adjacent magnets located outside of the winding; and
    wherein the L-shaped plates are integrally formed with the outer frame and are therefore able to enhance the magnetic efficiency of the electromagnetic field at four corners of the winding to provide increased driving force.

2. The magnet holding structure of auto-focus module as claimed in claim 1, wherein a receiving space is formed between each of four outer corners of the lens holder and the winding for correspondingly receiving one of the four inverted L-shaped plates therein.

* * * * *